(12) United States Patent
Lu et al.

(10) Patent No.: US 10,160,659 B2
(45) Date of Patent: Dec. 25, 2018

(54) TITANIUM-DIOXIDE-BASED DOUBLE-LAYER HOLLOW MATERIAL, PREPARATION METHOD THEREOF, AND APPLICATION THEREOF IN PHOTOCATALYTIC TREATMENT OF HYDROGEN SULFIDE

(71) Applicant: SOOCHOW UNIVERSITY, Suzhou (CN)

(72) Inventors: Jianmei Lu, Suzhou (CN); Dongyun Chen, Suzhou (CN); Jun Jiang, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 0 days.

(21) Appl. No.: 15/853,906

(22) Filed: Dec. 25, 2017

(65) Prior Publication Data

US 2018/0179079 A1 Jun. 28, 2018

(30) Foreign Application Priority Data

Dec. 28, 2016 (CN) .......................... 2016 1 1239594

(51) Int. Cl.
| | |
|---|---|
| *C01G 23/053* | (2006.01) |
| *C01G 23/08* | (2006.01) |
| *C08L 25/06* | (2006.01) |
| *C08J 7/12* | (2006.01) |
| *B01J 35/00* | (2006.01) |
| *B01D 53/52* | (2006.01) |
| *B05D 1/18* | (2006.01) |
| *B05D 7/00* | (2006.01) |
| *C01B 17/16* | (2006.01) |
| *B29B 11/14* | (2006.01) |
| *C08K 3/22* | (2006.01) |

(52) U.S. Cl.
CPC ............. *C01G 23/08* (2013.01); *B01D 53/52* (2013.01); *B01J 35/004* (2013.01); *B05D 1/18* (2013.01); *B05D 7/52* (2013.01); *B29B 11/14* (2013.01); *C01B 17/167* (2013.01); *C01G 23/053* (2013.01); *C08J 7/12* (2013.01); *C08L 25/06* (2013.01); *B05D 2201/02* (2013.01); *B05D 2451/00* (2013.01); *C01P 2002/30* (2013.01); *C01P 2004/03* (2013.01); *C01P 2004/04* (2013.01); *C01P 2004/32* (2013.01); *C01P 2004/34* (2013.01); *C01P 2004/64* (2013.01); *C08K 2003/2241* (2013.01)

(58) Field of Classification Search
None
See application file for complete search history.

(56) References Cited

U.S. PATENT DOCUMENTS

2013/0084318 A1* 4/2013 Ghosh Dastidar ... A61K 8/0279
424/401

\* cited by examiner

*Primary Examiner* — Daniel Berns
(74) *Attorney, Agent, or Firm* — SZDC Law P.C.

(57) ABSTRACT

A preparation method of a titanium-dioxide-based double-layer hollow material includes the following steps: (1) using polystyrene nanospheres with particle size of 180 nm as a template, tetrabutyl titanate as a precursor, to prepare hollow titanium dioxide by calcining; (2) subjecting said hollow titanium dioxide to carboxylation modification to prepare carboxylated titanium dioxide; and (3) dispersing said carboxylated titanium dioxide in ethanol, using chromic nitrate nonahydrate as an assembly agent and trimesic acid as a crosslinking agent to carry out layer-by-layer self-assembly so as to prepare the titanium-dioxide-based double-layer hollow material.

10 Claims, 4 Drawing Sheets

TITANIUM-DIOXIDE-BASED DOUBLE-LAYER HOLLOW MATERIAL, PREPARATION METHOD THEREOF, AND APPLICATION THEREOF IN PHOTOCATALYTIC TREATMENT OF HYDROGEN SULFIDE

This application claims priority to Chinese Patent Application No.: 201611239594.7, filed on Dec. 28, 2016, which is incorporated by reference for all purposes as if fully set forth herein.

TECHNICAL FIELD

The present invention relates to the technical field of functional materials, more particularly to a $TiO_2$-based double-layer hollow material and its preparation method and its application in photocatalytic treatment of $H_2S$.

BACKGROUND TECHNOLOGY $H_2S$ is a typical toxic gas, even at very low concentrations will make people feel stinky. And when the volume fraction of $H_2S$ in the air is higher than $10^{-6}$, it can cause considerable harm to the human body and even threaten life and health. In addition, the $H_2S$ exhibits a relatively strong acidity, and when some of the precision instruments are in contact with the $H_2S$, the internal precision of the device will be corroded leading to a lower or even less damage to the instrument. $H_2S$ is commonly found in the atmosphere and is used frequently in a variety of industries.

$TiO_2$ can be carried out at low concentrations of some typical toxic gas catalytic oxidation, which for $H_2S$ catalytic also has a significant effect. However, the rapid recombination of photoelectron-hole pairs and the narrow light response of $TiO_2$ forces its use to be limited to ultraviolet light (<387 nm). Thus, $TiO_2$ is often modified in different ways, such as doping transition metal ions, coupling with semiconductors, etc. to improve photocatalytic activity.

The metal-organic framework (MOF) is formed by assembling metal ions and organic ligands, which have a significant effect in terms of drug delivery, catalysis, gas storage and selective adsorption; however, existing MOF materials exhibit non-corrosive gases such as Hydrogen, methane, carbon dioxide and other excellent adsorption properties, and the adsorption of corrosive $H_2S$ effect is very poor.

SUMMARY OF THE INVENTION

The purpose of the present invention is to provide a titanium-dioxide-based double-layer hollow material and its preparation method. The MIL-100 is supported on the surface of the modified hollow $TiO_2$ by a layered self-loading method to prepare $TiO_2$@MIL-100 double-layer hollow materials, the photocatalytic effect of titanium dioxide on hydrogen sulfide is enhanced by the adsorption of hydrogen sulfide, so as to widely used in the photocatalytic separation of hydrogen sulfide.

In order to achieve the above purpose, the present invention provides the following technical solution.

A preparation method of a titanium-dioxide-based double-layer hollow material, which comprises following steps:

(1) using polystyrene nanospheres with particle size of 180 nm as a template, tetrabutyl titanate as a precursor, to prepare hollow titanium dioxide by calcining;

(2) subjecting said hollow titanium dioxide to carboxylation modification to prepare carboxylated titanium dioxide;

(3) dispersing said carboxylated titanium dioxide in ethanol, using chromic nitrate nonahydrate as an assembly agent and trimesic acid as a crosslinking agent to carry out layer-by-layer self-assembly so as to prepare the titanium-dioxide-based double-layer hollow material.

In the above solution, in step 1), heating styrene aqueous solution to 80 to 90° C. in the presence of a surfactant in nitrogen atmosphere; and adding the aqueous solution of initiator in drops, polymerizing for 10 to 20 hours to obtain polystyrene nanospheres. Preferably, after the polymerization, adding sodium chloride to obtain a precipitate, and then washing the precipitate with deionized water for several times, and then drying in a oven to get polystyrene nanospheres with particle size of 180 nm. The polystyrene nanospheres obtained according to the preparation method of the present invention has uniform size distribution, particle size is about 180 nm. The same size makes it suit for use as template, and the suitable hollow size ensure the mechanical strength of hollow titanium dioxide. It not only improve the processing ability for hydrogen sulfide, but also increase the processing stability.

In step 1), calcining is carried out at 500 to 700° C. for 2 to 3 hours, and the rate of heating is 1 to 5° C./min. The slow heating rate is beneficial to the homogeneous decomposition of the polystyrene template without destroying the titanium dioxide shell.

In step 1), adding tetrabutyl titanate into acetonitrile to prepare the tetrabutyl titanate solution by stirring; adding polystyrene nanospheres into the solvent to prepare the polystyrene suspension by ultrasonic dispersion; and then dripping ammonia, deionized water and tetrabutyl titanate solution into the polystyrene suspension, stirring for 1 hour to prepare a mixed liquid; and then washing the mixed liquid and centrifuging to obtain solid, drying and calcining the solid to prepare hollow titanium dioxide particles; the mass ratio of tetrabutyl titanate, polystyrene nanospheres and ammonia is 30:1:20. Ammonia inhibits the decomposition of tetrabutyl titanate and makes the outer layer of titanium dioxide even and controllable.

In step 2), the carboxylation modification is adding the hollow titanium dioxide to the ethanol solution of a silane coupling agent and stirring for 8 to 10 hours; and then taking the solid into the N, N-dimethylformamide solution of succinic anhydride and stirring for 8 to 10 hours to obtain carboxylated titanium dioxide; the mass ratio of titanium dioxide, silane coupling agent and succinic anhydride is 50:1:1.

In step 3), each self-assembly step is adding the ethanol solution of chromium nitrate nonahydrate to the carboxylated titanium dioxide ethanol dispersion, stirring and then centrifuging with ethanol and then adding the trimesic acid ethanol solution to continue stirring; then washing and centrifuging to remove the liquid. The method of layer-by-layer self-assembly makes the preparation of organic metal frame material simple and rapid.

In the present invention, polystyrene is prepared from styrene as template, and tetrabutyl titanate is used as precursor to prepare hollow $TiO_2$; And then the carboxylation modification, and then through the layers of self-loading method in the surface wrapped MIL-100 material, to obtain $TiO_2$-based double hollow material; It can be a large number of adsorption of $H_2S$, to achieve excellent photocatalytic effect. The present invention thus discloses the use of the $TiO_2$-based double-layer hollow material in the $H_2S$ photocatalytic treatment. Meanwhile, the present invention also discloses the use of the above-mentioned $TiO_2$-based double-layer hollow material in the treatment of polluted gas.

The advantages of the present invention:

1. The method for preparing titanium dioxide-based double-layer hollow material disclosed in the present invention has the advantage that the raw materials are low cost, easy to obtain and easy to operate. The whole process is not expensive equipment, which is very important for industrial application.

2. The $TiO_2$-based double-layer hollow material disclosed in the present invention is a novel porous material having high surface area, high porosity and chemically adjustable, and has a high efficiency photocatalytic effect on $H_2S$, and can be used for each of The removal of toxic gases in the environment of $H_2S$.

DETAILED DESCRIPTIONS

Embodiment 1

Synthesis of Polystyrene Nanospheres.

Figure 1:
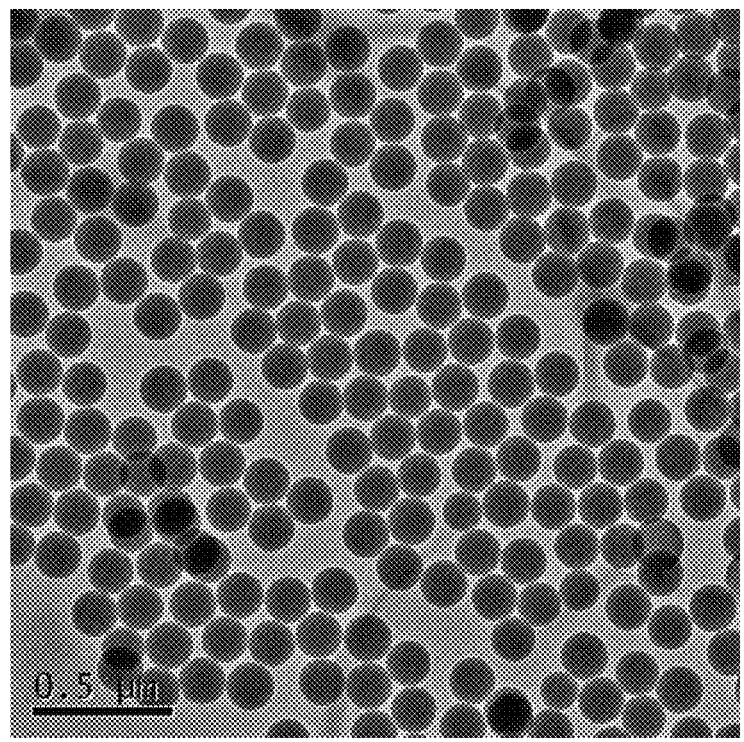
FIG. 1. TEM images of polystyrene.
Figure 2:
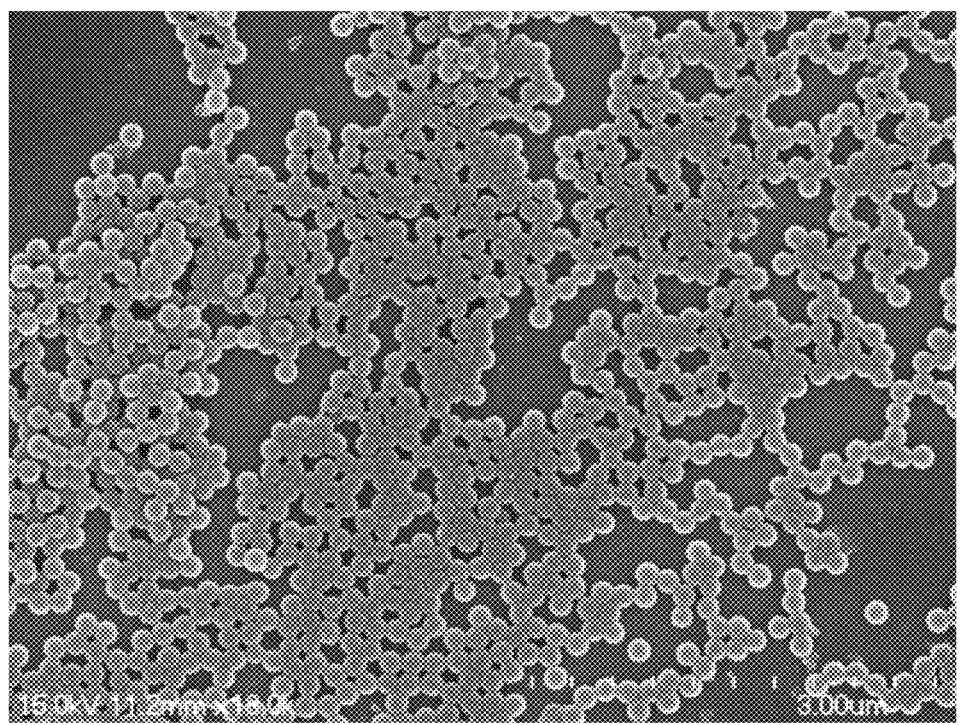
FIG. 2. SEM images of polystyrene.

0.05 g of sodium dodecyl sulfate and 15 g of styrene monomer were added to 80 mL of water under stirring, and the temperature was raised to 80° C. under nitrogen atmosphere. Thereafter, 20 mL of an aqueous solution containing 0.15 g of potassium persulfate was gradually added dropwise. The mixture was stirred for an additional 10 hours and the polystyrene nanospheres were precipitated by the addition of sodium chloride. The final product was washed several times with ion-exchanged water and dried in an oven. The TEM and SEM images of polystyrene were shown in FIG. 1 and FIG. 2, and the structure was uniform and the particle size was 180 nm.

Synthesis of Hollow $TiO_2$.

Figure 3:
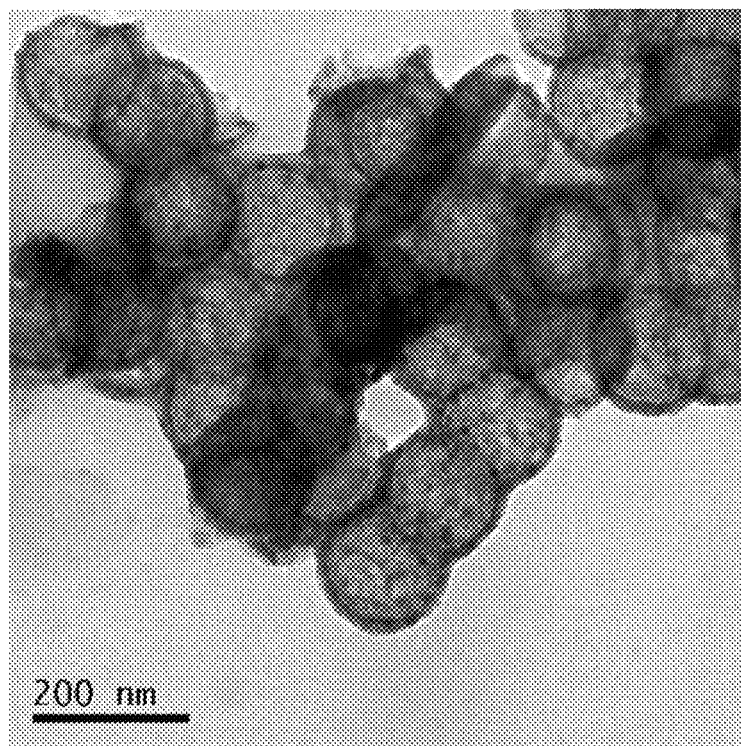
FIG. 3. TEM images of hollow $TiO_2$.
Figure 4:
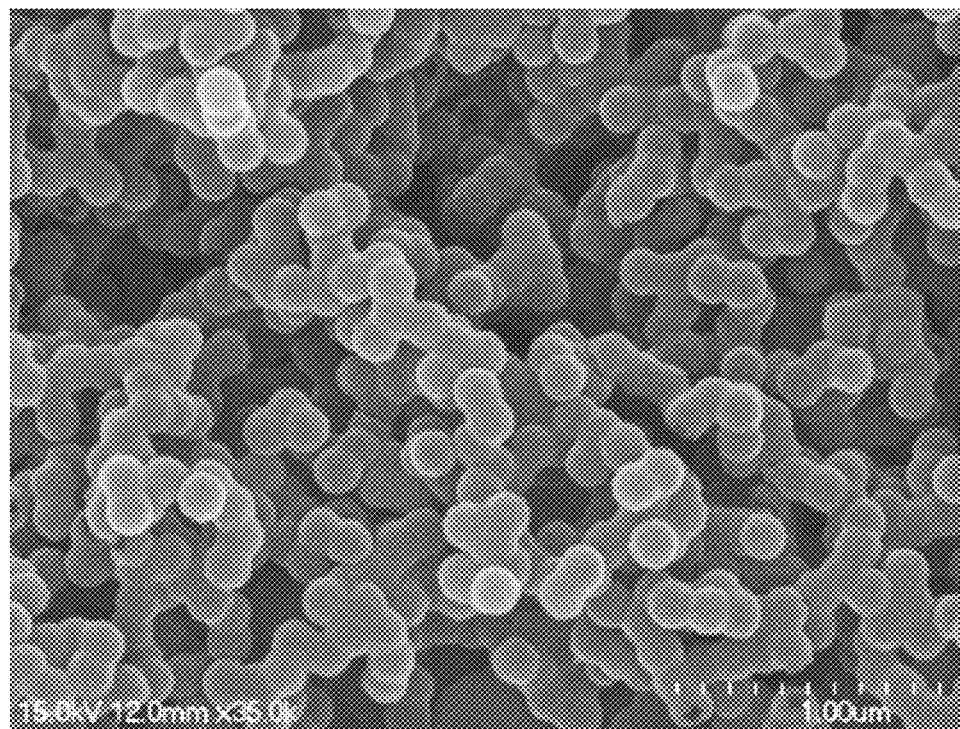
FIG. 4. SEM images of hollow $TiO_2$.

0.5 mL of tetrabutyl titanate was added to 20 mL of acetonitrile and the stirring was continued for 10 minutes. Then, 0.017 g of polystyrene nanospheres were added to 90 ml of acetonitrile and dispersed by sonication. And 0.3 mL of aqueous ammonia, 0.06 ml of deionized water and 20 mL of a tetrabutyl titanate solution were added dropwise to the prepared polystyrene suspension. The mixture was stirred at room temperature for 1 hour to complete the chemical reaction. The product was washed in ethanol and centrifuged three times and dried. And then calcined at 500° C. at a heating rate of 1° C. per minute for 2 hours. FIG. 3 and FIG. 4 show the TEM and SEM images of the hollow $TiO_2$. Through the figures it can be seen that the structure of the hollow $TiO_2$ is even.

Synthesis of Carboxylated $TiO_2$.

The hollow $TiO_2$ was added to the ethanol solution of the silane coupling agent for 8 hours. After centrifugation, it was transferred to a solution of succinic anhydride in N, N-dimethylformamide to continue stirring for 8 hours. The mass ratio of titanium dioxide, silane coupling agent and succinic anhydride is 50:1:1.

Synthesis of $TiO_2$@MIL-100 Double Hollow Material.

The carboxylated $TiO_2$ was dispersed in 10 ml of ethanol, and then 10 mL of a solution of chromium nitrate nonahydrate was added and stirred at room temperature for 15 minutes. After centrifugation with ethanol and then 10 ml of a solution of purified terephthalic acid in ethanol was added and stirred for 30 minutes. After centrifugation, the above procedure was repeated 20 times to obtain $TiO_2$@MIL-100 double-layer hollow material.

Figure 5:
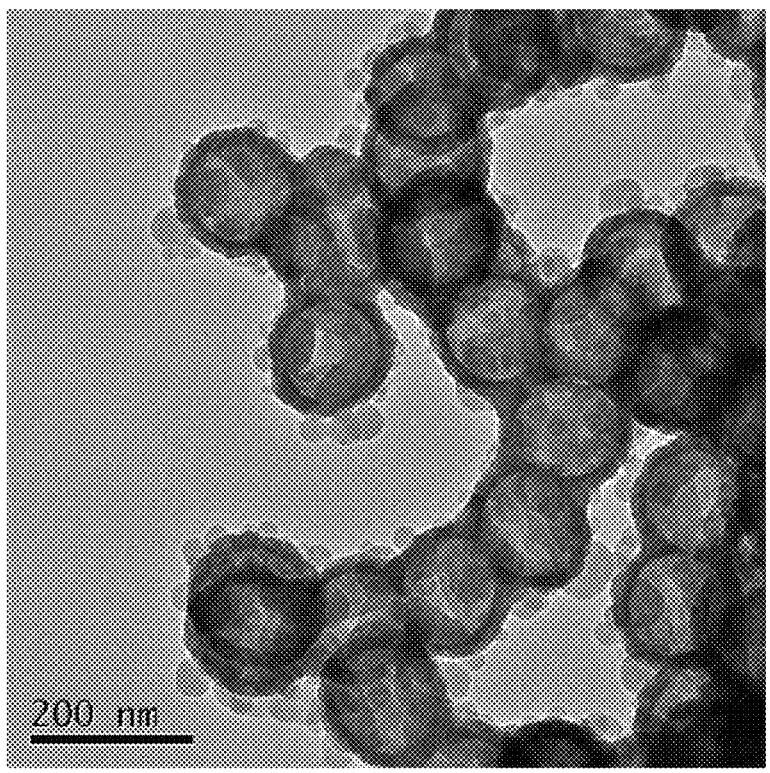
FIG. 5. TEM images of $TiO_2$@MIL-100.
Figure 6:
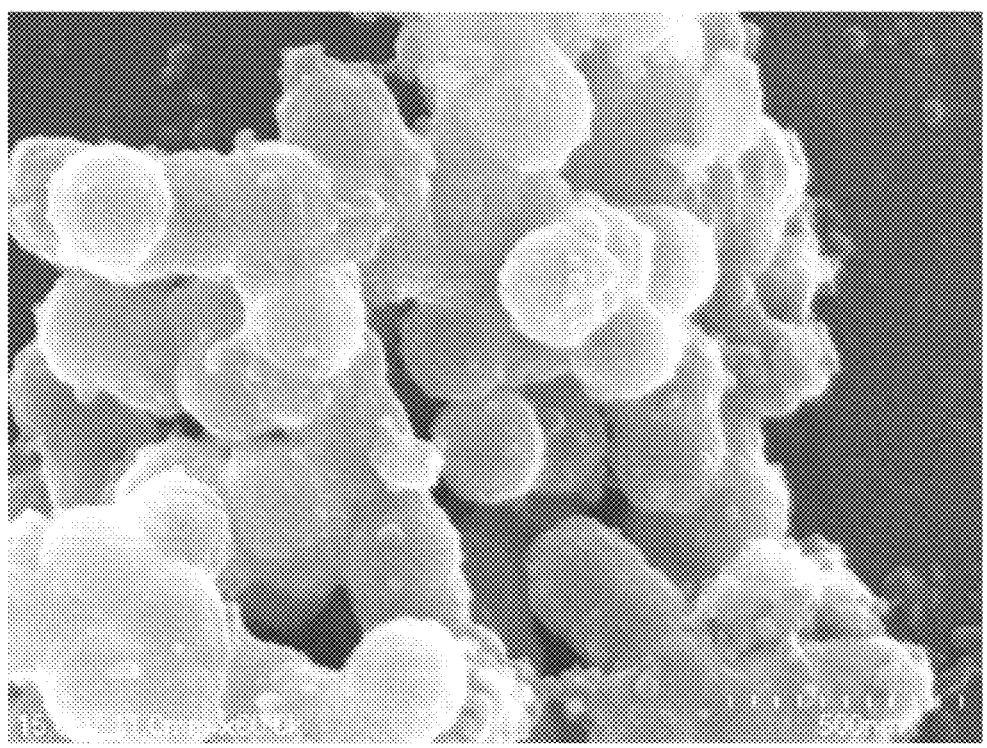
FIG. 6. SEM images of $TiO_2$@MIL-100.

FIG. 5 and FIG. 6 shows the TEM and SEM images of $TiO_2$@MIL-100 double-layer hollow material.

Embodiment 2

Photocatalysis of $H_2S$.

A batch reactor (1.5 L volume) containing a quartz glass was used for photocatalytic oxidation of hydrogen sulfide. 0.5 g of the above-prepared catalyst $TiO_2$@MIL-100 double-layer hollow material was deposited on quartz glass and then the reactor was evacuated. Next, 1 L of high purity air and 0.5 L of mixed gas containing $H_2S$ (100 ppm concentration) were introduced into the batch reactor and the concentration of $H_2S$ was analyzed using GC.

Figure 7:
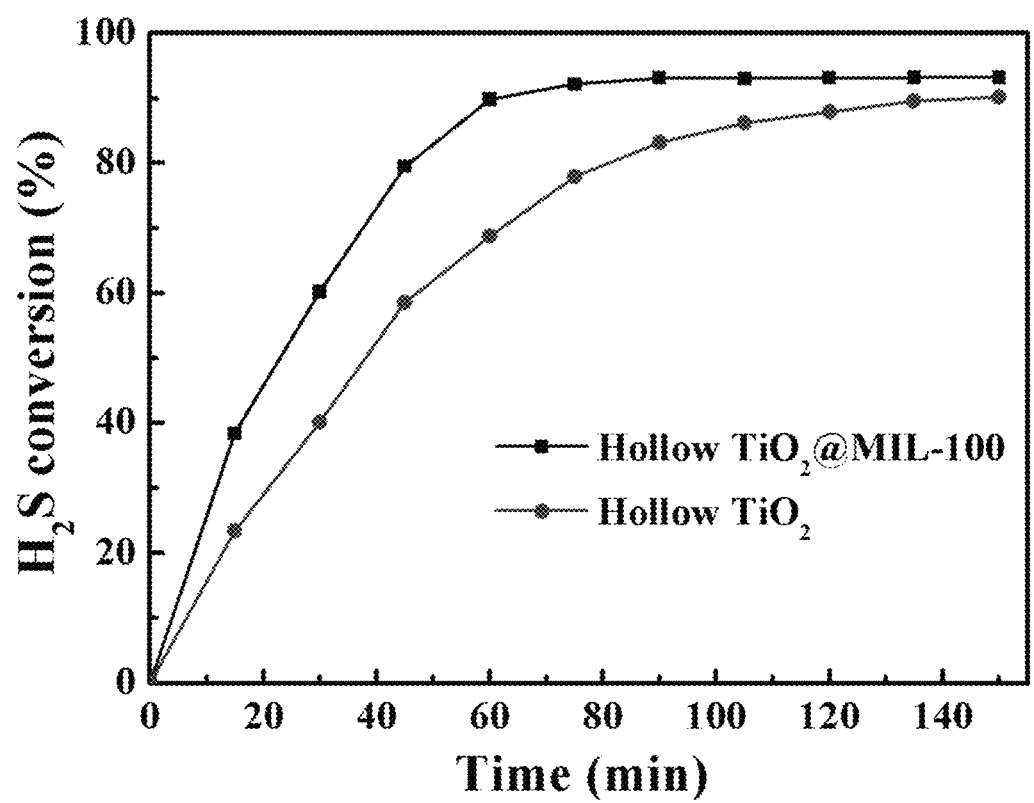
FIG. 7. Photocatalytic effect of $TiO_2$@MIL-100 on $H_2S$.

FIG. 7 shows photocatalytic effect of $TiO_2$@MIL-100 on $H_2S$.

Through the above embodiment, it shows that the $TiO_2$@MIL-100 hollow material synthesized by the present invention has good effect on the photocatalytic hydrogen sulfide gas; and its preparation process is simple, raw materials is easy to get, has the application prospect in the treatment of the toxic hydrogen sulfide gas.

Embodiment 3

Synthesis of Polystyrene Nanospheres.

0.05 g of sodium dodecyl sulfate and 15 g of styrene monomer were added to 80 mL of water under stirring, and the temperature was raised to 90° C. under nitrogen atmosphere. Thereafter, 20 mL of an aqueous solution containing 0.15 g of potassium persulfate was gradually added dropwise. The mixture was stirred for an additional 8 hours and the polystyrene nanospheres were precipitated by the addition of sodium chloride. The final product was washed several times with ion-exchanged water and dried in an oven. The structure was uniform and the particle size was 180 nm.

Synthesis of Hollow $TiO_2$.

0.5 mL of tetrabutyl titanate was added to 20 mL of acetonitrile and the stirring was continued for 20 minutes. Then, 0.017 g of polystyrene nanospheres were added to 90 ml of acetonitrile and dispersed by sonication. And 0.3 mL of aqueous ammonia, 0.06 ml of deionized water and 20 mL of a tetrabutyl titanate solution were added dropwise to the prepared polystyrene suspension. The mixture was stirred at room temperature for 2 hour to complete the chemical reaction. The product was washed in ethanol and centrifuged three times and dried. And then calcined at 700° C. at a heating rate of 5° C. per minute for 2 hours. The structure of the hollow $TiO_2$ is even.

Synthesis of Carboxylated $TiO_2$.

The hollow $TiO_2$ was added to the ethanol solution of the silane coupling agent for 10 hours. After centrifugation, it was transferred to a solution of succinic anhydride in N, N-dimethylformamide to continue stirring for 10 hours. The mass ratio of titanium dioxide, silane coupling agent and succinic anhydride is 50:1:1.

Synthesis of $TiO_2$@MIL-100 Double Hollow Material.

The carboxylated $TiO_2$ was dispersed in 10 ml of ethanol, and then 10 mL of a solution of chromium nitrate nonahydrate was added and stirred at room temperature for 30 minutes. After centrifugation with ethanol and then 10 ml of a solution of purified terephthalic acid in ethanol was added and stirred for 60 minutes at 25° C. After centrifugation, the above procedure was repeated 10 times to obtain $TiO_2$@MIL-100 double-layer hollow material. It has a good photocatalytic effect on hydrogen sulfide gas, reaching more than 90% in 1 hour.

The invention claimed is:

1. A preparation method of a titanium-dioxide-based double-layer hollow material, which comprises following steps:
   (1) using polystyrene nanospheres with particle size of 180 nm as a template, tetrabutyl titanate as a precursor, to prepare hollow titanium dioxide by calcining;
   (2) subjecting said hollow titanium dioxide to carboxylation modification to prepare carboxylated titanium dioxide;
   (3) dispersing said carboxylated titanium dioxide in ethanol, using chromic nitrate nonahydrate as an assembly agent and trimesic acid as a crosslinking agent to carry out layer-by-layer self-assembly so as to prepare the titanium-dioxide-based double-layer hollow material.

2. The preparation method of a titanium-dioxide-based double-layer hollow material according to claim 1, wherein in step (1), heating styrene aqueous solution to 80 to 90° C. in the presence of a surfactant in nitrogen atmosphere; and adding an aqueous solution of initiator in drops, polymerizing for 10 to 20 hours; and after the polymerization, adding sodium chloride to obtain a precipitate, and then washing the precipitate with deionized water and then drying at 60° C. to prepare a polystyrene nanosphere.

3. The preparation method of a titanium-dioxide-based double-layer hollow material according to claim 1, wherein in step (1), calcining is carried out at 500 to 700° C. for 2 to 3 hours, and the rate of heating is 1 to 5° C./min.

4. The preparation method of a titanium-dioxide-based double-layer hollow material according to claim 1, wherein in step (1), adding tetrabutyl titanate into acetonitrile to prepare the tetrabutyl titanate solution by stirring; adding polystyrene nanospheres into a solvent to prepare a polystyrene suspension with ultrasonic dispersion; and then dripping ammonia, deionized water and tetrabutyl titanate solution into the polystyrene suspension, stirring for 1 hour to prepare a mixed liquid; and then washing the mixed liquid and centrifuging to obtain solid, drying and calcining the solid to prepare hollow titanium dioxide particles; the mass ratio of tetrabutyl titanate, polystyrene nanospheres and ammonia is 30:1:20.

5. The preparation method of a titanium-dioxide-based double-layer hollow material according to claim 1, wherein in step (2), the carboxylation modification is adding the hollow titanium dioxide to an ethanol solution of a silane coupling agent and stirring for 8 to 10 hours to give a solid; and then taking the solid into an the N, N-dimethylformamide solution of succinic anhydride and stirring for 8 to 10 hours to obtain carboxylated titanium dioxide; the mass ratio of titanium dioxide, silane coupling agent and succinic anhydride is 50:1:1.

6. The preparation method of a titanium-dioxide-based double-layer hollow material according to claim 1, wherein in step (3), each self-assembly step is adding an ethanol solution of chromium nitrate nonahydrate to the carboxylated titanium dioxide ethanol dispersion, stirring and then centrifuging with ethanol and then adding a trimesic acid ethanol solution to continue stirring; then washing and centrifuging to remove the liquid.

7. The preparation method of a titanium-dioxide-based double-layer hollow material according to claim 1, wherein in step (3), the mass ratio of carboxylated titanium dioxide, chromic nitrate nonahydrate and trimesic acid is 20:1:1, and the number of times of layer-by-layer self-assembly is 10 to 20.

8. Titanium-dioxide-based double-layer hollow material prepared by the preparation method according to claim 1.

9. A method of photocatalytically treating hydrogen sulfide comprising:
   providing the titanium-dioxide-based double-layer hollow material according to claim 8; and
   treating hydrogen sulfide with the titanium-dioxide-based double-layer hollow material.

10. A method of treating polluted gas comprising:
    providing the titanium-dioxide-based double-layer hollow material according to claim 8; and
    treating polluted gas with the titanium-dioxide-based double-layer hollow material.

* * * * *